US012075727B2

(12) United States Patent
Li et al.

(10) Patent No.: US 12,075,727 B2
(45) Date of Patent: Sep. 3, 2024

(54) RATOONING RICE HARVESTING HEADER AND HARVESTER INCLUDING THE SAME

(71) Applicant: Jiangsu University, Jiangsu (CN)

(72) Inventors: Yaoming Li, Jiangsu (CN); Hanhao Wang, Jiangsu (CN); Mingsen Huang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/559,799

(22) PCT Filed: Feb. 23, 2022

(86) PCT No.: PCT/CN2022/077355
§ 371 (c)(1),
(2) Date: Nov. 9, 2023

(87) PCT Pub. No.: WO2023/082490
PCT Pub. Date: May 19, 2023

(65) Prior Publication Data
US 2024/0251714 A1    Aug. 1, 2024

(30) Foreign Application Priority Data

Nov. 10, 2021   (CN) .......................... 202111325013.2
Jan. 26, 2022   (CN) .......................... 202210092168.4

(51) Int. Cl.
*A01D 45/04*     (2006.01)
*A01D 41/06*     (2006.01)
(Continued)

(52) U.S. Cl.
CPC ............. *A01D 45/04* (2013.01); *A01D 41/06* (2013.01); *A01D 41/14* (2013.01); *A01D 47/00* (2013.01)

(58) Field of Classification Search
CPC ........ A01D 45/04; A01D 41/06; A01D 41/14; A01D 47/00
See application file for complete search history.

(56) References Cited

U.S. PATENT DOCUMENTS

RE25,385 E  *  5/1963  Jacobson ............... A01D 41/14
                                                      56/15.8
4,174,601 A    11/1979  Griffin
(Continued)

FOREIGN PATENT DOCUMENTS

CN         2647034        10/2004
CN        103782719        5/2014
(Continued)

OTHER PUBLICATIONS

"International Search Report (Form PCT/ISA/210) of PCT/CN2022/077355," mailed on Aug. 8, 2022, with English translation thereof, pp. 1-6.

*Primary Examiner* — Arpad Fabian-Kovacs
(74) *Attorney, Agent, or Firm* — JCIPRNET (57) ABSTRACT

The present disclosure provides a ratooning rice harvesting header and a harvester including the same. The ratooning rice harvesting header includes a multi-layer adjustable disc cutter, a header, and an ear cutter. The multi-layer adjustable disc cutter is mounted below the header and located below a rear portion of the ear cutter. The ear cutter is mounted at a front end of the header. The multi-layer adjustable disc cutter includes at least one group of multi-layer disc cutting assemblies. Each group of multi-layer disc cutting assemblies includes two multi-layer disc cutting assemblies. Each of the multi-layer disc cutting assemblies includes three layers of vertically arranged blades. The use of the multi-layer adjustable disc cutter in cooperation with the ear cutter
(Continued)

can reduce the straw-grain ratio of the part cut from the crops to reduce the power consumption of the harvester.

4 Claims, 5 Drawing Sheets

(51) Int. Cl.
*A01D 41/14* (2006.01)
*A01D 47/00* (2006.01)

(56) References Cited

U.S. PATENT DOCUMENTS

| | | | | |
|---|---|---|---|---|
| 4,272,947 | A | * | 6/1981 | Mizzi ................ A01D 45/10 56/121.4 |
| 4,512,142 | A | * | 4/1985 | Landry ............... A01D 45/10 D15/127 |
| 4,677,813 | A | * | 7/1987 | Stiff ................... A01D 45/10 56/13.9 |
| 2005/0028503 | A1 | * | 2/2005 | Hinds ................. A01D 45/10 56/56 |
| 2014/0083073 | A1 | | 3/2014 | Doerscher, Sr. et al. |
| 2019/0335664 | A1 | * | 11/2019 | Horning ............. A01D 45/021 |
| 2020/0253120 | A1 | * | 8/2020 | Hefner ............... A01D 34/42 |
| 2020/0404843 | A1 | * | 12/2020 | Li ...................... A01D 41/1252 |

FOREIGN PATENT DOCUMENTS

| | | | | |
|---|---|---|---|---|
| CN | 105491875 | | 4/2016 | |
| CN | 108811714 | | 11/2018 | |
| CN | 109588106 A | * | 4/2019 | .......... A01B 63/008 |
| CN | 110892819 | | 3/2020 | |
| CN | 113273387 | | 8/2021 | |
| CN | 113519264 A | * | 10/2021 | ............ A01D 69/06 |
| CN | 116868775 A | * | 10/2023 | ............ A01D 47/00 |
| DE | 102005025319 A1 | * | 12/2006 | ............ A01D 34/83 |
| WO | 2019035703 | | 2/2019 | |
| WO | WO-2023082490 A1 | * | 5/2023 | ............ A01D 41/14 |

* cited by examiner

RATOONING RICE HARVESTING HEADER AND HARVESTER INCLUDING THE SAME

CROSS-REFERENCE TO RELATED APPLICATION

This application is a 371 of international application of PCT application serial no. PCT/CN2022/077355, filed on Feb. 23, 2022, which claims the priority benefit of China application serial no. 202111325013.2, filed on Nov. 10, 2021 and China application serial no. 202210092168.4, filed on Jan. 26, 2022. The entirety of each of the above-mentioned patent applications is hereby incorporated by reference herein and made a part of this specification.

BACKGROUND

Technical Field

The present disclosure relates to the technical field of agricultural machinery, and specifically to a ratooning rice harvesting header including a multi-layer adjustable disc cutter, and a harvester including the same.

Related Art

As a special rice planting mode of "one seed, two harvests", ratooning rice can head again on the rice stubbles left after harvesting in the first season to form rice in the next season. This mode has the advantages such as high cropping index, saving seeds, low labor costs, and high economic benefits, and is an effective way to ensure the steady development of rice production and food security. However, the first season harvest of ratooning rice is the main bottleneck in the popularization and development of this planting mode. If an existing ordinary rice combine harvester is used for first season harvest. 45% to 50% of rice stubbles will be rolled, seriously affecting the rice yield in the next season. Because ratooning rice needs to be harvested at a stubble height of 30 to 40 cm, structural parameters and motion parameters of ordinary full-feeding rice harvesters no longer match this requirement of ratooning rice, resulting in a power waste.

A ratooning rice harvester having a variable tread between drive wheels in the prior art includes a chassis, a pair of front wheels arranged at a front end of the chassis, and a rear wheel arranged at a rear end of the chassis. On each side of the bottom of the front end of the chassis, a telescopic mechanism for controlling lateral movement of the front wheel on the corresponding side is arranged. A header and a threshing device are further arranged at the front end of the chassis. Although the ratooning rice harvester can avoid rice stubbles by adjusting the drive wheels, it cannot cope with various production situations due to the use of ordinary road wheels. In addition, the ratooning rice harvester is not equipped with a grain tank, leading to low working efficiency. As a result, the ratooning rice harvester is likely to roll ratooning rice stubbles many times, leading to an increased rolling rate of rice stubbles. A four-wheel drive, low-rolling ratooning rice harvester in the prior art includes a high-clearance four-wheel drive chassis, a header, a conveying component, a threshing component, a grain tank, and other components. In this harvester, narrow wheels for paddy fields are used to reduce the stubble rolling rate. However, such road wheels lead to an increase in the ground contact pressure of the harvester, making the harvester likely to sink in the deep muddy areas. In addition, the harvester has a low bearing capacity and requires frequent grain unloading, resulting in a reduced working efficiency.

SUMMARY OF INVENTION

Technical Problem

The present disclosure aims to solve, at least to some extent, one of the above technical problems. An objective of the present disclosure is to provide a ratooning rice harvesting header and a harvester including the same. The use of a multi-layer adjustable disc cutter in cooperation with an ear cutter can reduce the straw-grain ratio of the part cut from the crops to reduce the power consumption of the harvester, and ensure that the stubble height meets requirements for the growth of ratooning rice in the next season. In addition, the multi-layer adjustable disc cutter is used to cut stalks between an ear cutting height H1 and the stubble height H2 many times, to prevent excessively long stalks from falling into the field to cover dormant buds of the ratooning rice, thereby facilitating the utilization of stalks into the field and the smooth growth of rice in the next season.

Solution to Problem

The following technical solutions are employed in the present disclosure.

A ratooning rice harvesting header is provided, including a multi-layer adjustable disc cutter, a header, and an ear cutter, where the multi-layer adjustable disc cutter is mounted below the header and located below a rear portion of the ear cutter, and the ear cutter is mounted at a front end of the header; the multi-layer adjustable disc cutter includes at least one group of multi-layer disc cutting assemblies, each group of the multi-layer disc cutting assemblies includes two of the multi-layer disc cutting assemblies, each of the multi-layer disc cutting assemblies includes three layers of vertically arranged blades, and blade rotation directions of the two of the multi-layer disc cutting assemblies are opposite to each other.

In the above solution, the multi-layer adjustable disc cutter includes the multi-layer disc cutting assemblies, a mounting plate, a transmission mechanism, an adjusting plate, and fixed blades; and the multi-layer disc cutting assemblies are mounted on the mounting plate, and a plurality of the fixed blades are arranged in a length direction of the mounting plate; two ends of the mounting plate are connected to the adjusting plate, an upper end of the adjusting plate is hingedly connected to the header, and the multi-layer disc cutting assemblies are connected to the transmission mechanism.

Further, the multi-layer adjustable disc cutter further includes a plurality of crop separation plates; and the crop separation plates are uniformly distributed in the length direction of the mounting plate, and a group of the multi-layer disc cutting assemblies having opposite rotation directions are mounted between every two adjacent ones of the crop separation plates.

Further, each of the multi-layer disc cutting assemblies includes blade mounting flanges, a blade shaft, and at least three layers of blades; and at least three of the blade mounting flanges are arranged at one end of the blade shaft sequentially from top to bottom, a spacer sleeve is mounted between every two of the blade mounting flanges, the blades are mounted on the blade mounting flanges sequentially from top to bottom, and diameters of the blades sequentially decrease from top to bottom.

Further, each of the multi-layer disc cutting assemblies includes three layers of blades, including a large blade, a middle-sized blade, and a small blade.

Further, the large blade, the middle-sized blade, and the small blade are all semi-circular saw blades;

the large blade, the middle-sized blade, and the small blade are mounted on the blade mounting flanges of the blade shaft sequentially from top to bottom; and a diameter of the large blade is larger than a diameter of the middle-sized blade, and the diameter of the middle-sized blade is larger than a diameter of the small blade.

In the above solution, the blades of each group of the multi-layer disc cutting assemblies of the multi-layer adjustable disc cutter partially overlap the blades of an adjacent group of the multi-layer disc cutting assemblies in a space.

In the above solution, each of the blade mounting flanges includes a blade fixing disc and a blade fixing disc spoke; and the blade fixing disc spoke is mounted on the blade fixing disc.

In the above solution, the upper end of the adjusting plate is provided with a mounting groove arranged longitudinally, and the mounting groove is configured to hingedly connect to the header.

In the above solution, the ratooning rice harvesting header further includes: a disc cutter angle adjusting device, where one end of the disc cutter angle adjusting device is connected to the mounting plate, and an other end of the disc cutter angle adjusting device is configured to connect to a chassis of a harvester.

In the above solution, the ratooning rice harvesting header further includes: a disc cutter height adjusting device, configured to adjust a relative distance between the multi-layer adjustable disc cutter and the header, where one end of the disc cutter height adjusting device is connected to the adjusting plate, and an other end of the disc cutter height adjusting device is connected to the header.

A harvester including the ratooning rice harvesting header.

Effects of Invention

Compared with the prior art, the present disclosure has the following advantages.

1. In the present disclosure, the multi-layer adjustable disc cutter can cut stalks between the ear cutting height H1 and the stubble height H2 many times, to prevent excessively long stalks from falling into the field, thereby facilitating the utilization of stalks into the field and the smooth growth of rice in the next season.

2. In the present disclosure, the ear cutter only harvests the ears with a small quantity of stalks, and can realize the lightweight design of the header and reduce the power consumption of subsequent working components.

3. In the present disclosure, because the ear cutter only harvests ears with a short length of stalks, and the stalks between the ear cutting height H1 and the stubble height H2 are cut many times by the multi-layer adjustable disc cutter, the harvester does not need to be equipped with a straw pulverizing device, thereby realizing the lightweight design and miniaturization of the entire harvester.

4. In the present disclosure, the working height and the cutting angle of the adjustable disc cutter can be adjusted by the adjusting plates and hydraulic cylinders, the spacer sleeve can be used to adjust the spacing between the blade mounting flanges, and a hydraulic transmission assembly can be used to steplessly adjust the working speed of the adjustable disc cutter. Therefore, the present disclosure can effectively adapt to crops having different heights and the working speeds of different harvesters, providing a good adaptability for different kinds of ratooning rice.

5. In the present disclosure, the multi-layer adjustable disc cutter and the ear cutter can be used in combination not only for harvesting ratooning rice, but also for harvesting ordinary single-crop and double-crop rice, and various other stalk crops such as wheat and rape. Therefore, the present disclosure has a wide market prospect.

In the drawings: 1. multi-layer adjustable disc cutter; 2. header; 3. ear cutter; 1-1. multi-layer disc cutting assembly; 1-2. cutter bearing holder; 1-3. mounting plate; 1-4. cutter bevel gear; 1-5. transmission bevel gear; 1-6. transmission shaft; 1-7. transmission shaft bearing; 1-8. hydraulic transmission assembly; 1-9. adjusting plate; 1-10. fixed blade; 1-11. disc cutter angle adjusting device; 1-12. crop separation plate; 1-13. disc cutter height adjusting device; 1-1-1. blade mounting flange; 1-1-2. blade shaft; 1-1-3. large blade; 1-1-4. middle-sized blade; 1-1-5. small blade; 1-1-6. spacer sleeve; 1-11-1. first hydraulic cylinder connecting base; 1-11-2. disc cutter angle adjusting hydraulic cylinder; 1-11-3. second hydraulic cylinder connecting base; 1-11-4. diverter valve; 1-11-5. header height adjusting hydraulic cylinder; 1-13-1. third hydraulic cylinder connecting base; 1-13-2. disc cutter height adjusting hydraulic cylinder; 1-13-3. fourth hydraulic cylinder connecting base; 1-13-4. two-way solenoid valve; 1-1-1-1. blade fixing disc; 1-1-1-2. blade fixing disc spoke.

DESCRIPTION OF EMBODIMENTS

Embodiments of the present disclosure will be described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

Embodiment 1

Figure 1:
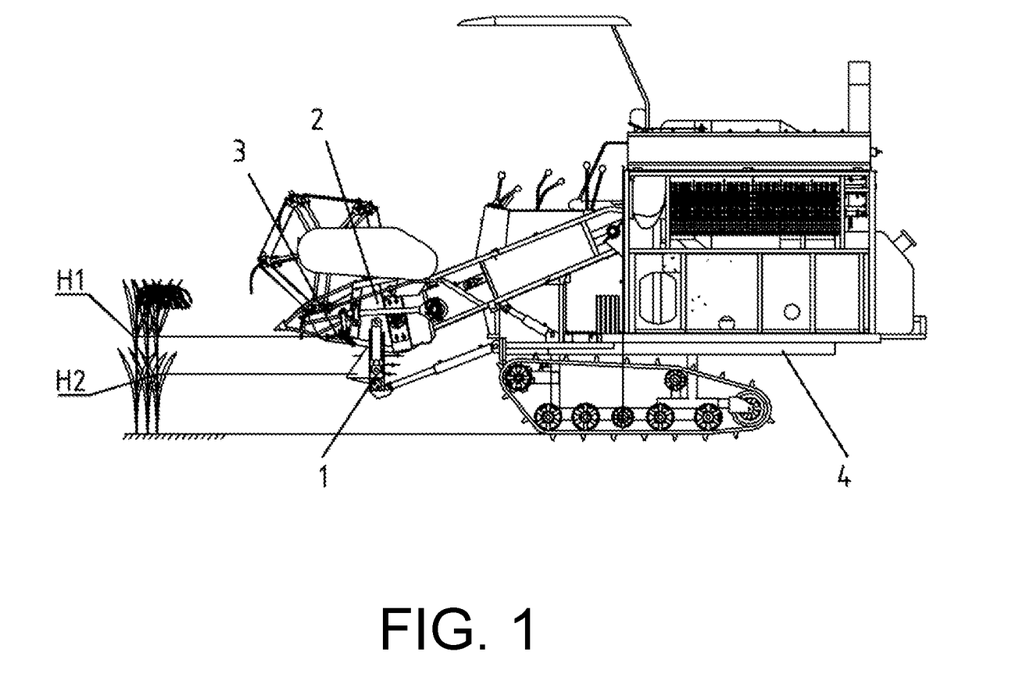
FIG. 1 is a structural diagram of a ratooning rice harvesting header including a multi-layer adjustable disc cutter according to an embodiment of the present disclosure.

FIG. 1 shows a preferred embodiment of a ratooning rice harvesting header. The ratooning rice harvesting header includes a multi-layer adjustable disc cutter 1, a header 2, and an ear cutter 3. The multi-layer adjustable disc cutter 1 is mounted below the header 2 and located below a rear portion of the ear cutter 3. The ear cutter 3 is fixedly mounted at a front end of the header 2. The multi-layer adjustable disc cutter 1 includes at least one group of multi-layer disc cutting assemblies 1-1. Each group of multi-layer disc cutting assemblies includes two multi-layer disc cutting assemblies 1-1. Each of the multi-layer disc cutting assemblies 1-1 includes at least three layers of vertically arranged blades. Blade rotation directions of the two multi-layer disc cutting assemblies 1-1 are opposite to each other.

Figure 2:
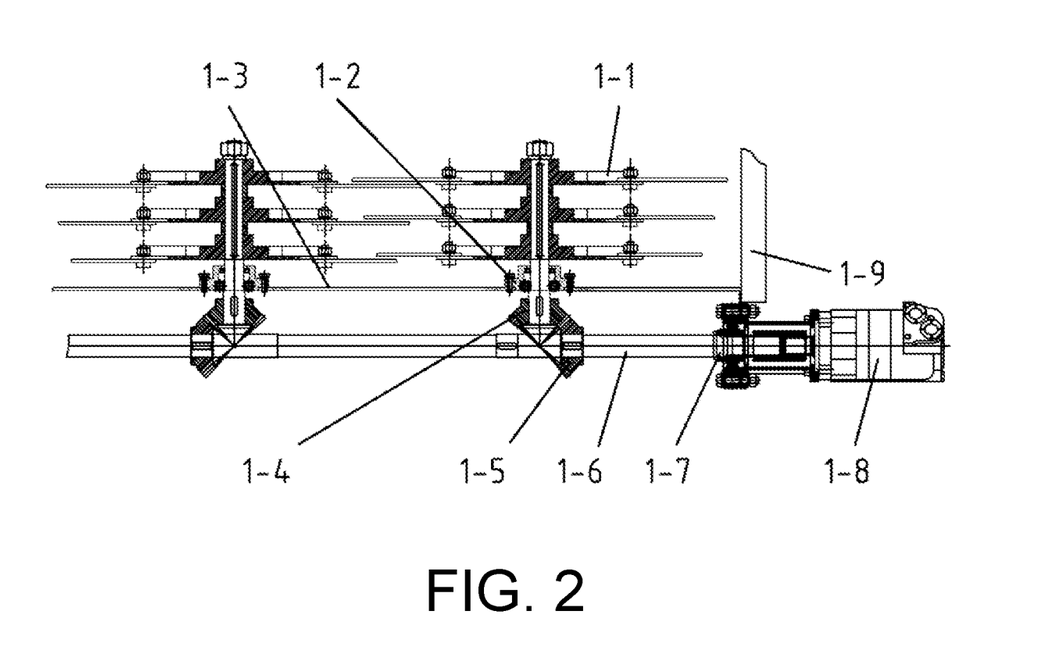
FIG. 2 is a front view of a multi-layer adjustable disc cutter according to an embodiment of the present disclosure.
Figure 3:
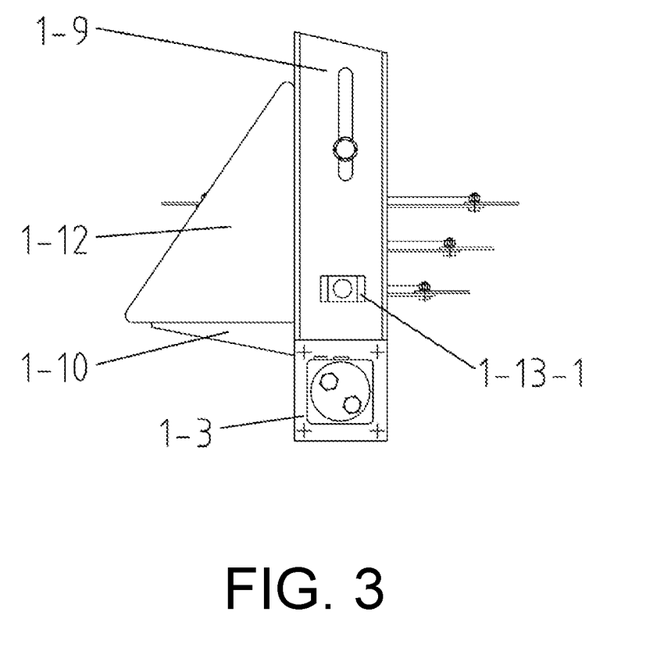
FIG. 3 is a left view of a multi-layer adjustable disc cutter according to an embodiment of the present disclosure.

As shown in FIG. 2 and FIG. 3, the multi-layer adjustable disc cutter 1 includes the multi-layer disc cutting assemblies 1-1, a cutter bearing holder 1-2, a mounting plate 1-3, an adjusting plate 1-9, fixed blades 1-10, and crop separation plates 1-12. The multi-layer disc cutting assemblies 1-1 are mounted on the mounting plate 1-3 through the cutter bearing holder 1-2. Two ends of the mounting plate 1-3 are connected to the adjusting plate 1-9. An upper end of the adjusting plate 1-9 is hingedly connected to the header 2. The multi-layer disc cutting assemblies 1-1 are connected to the transmission mechanism.

According to this embodiment, preferably, the transmission mechanism includes cutter bevel gears 1-4, transmission bevel gears 1-5, a transmission shaft 1-6, transmission shaft bearings 1-7, and a hydraulic transmission assembly 1-8. A cutter bevel gear 1-4 is mounted at one end of each of the multi-layer disc cutting assemblies 1-1. The cutter bevel gear 1-4 is meshed with a corresponding transmission bevel gear 1-5 for transmission. The transmission bevel gear 1-5 is mounted on the transmission shaft 1-6. Adjacent transmission bevel gears 1-5 are mounted in opposite directions relative to an axis of the transmission shaft 1-6, so that rotation directions of adjacent multi-layer disc cutting assemblies 1-1 are opposite to each other. Two ends of the transmission shaft 1-6 are mounted on the mounting plate 1-3 through the transmission shaft bearings 1-7. The hydraulic transmission assembly 1-8 is arranged at one end of the transmission shaft 1-6 to provide power for rotating the transmission shaft 1-6. Preferably, the upper end of the adjusting plate 1-9 is provided with a mounting groove arranged longitudinally, and the mounting groove is configured to hingedly connect to the header 2, so that a relative distance between the multi-layer adjustable disc cutter 1 and the header 2 can be adjusted.

Figure 4:
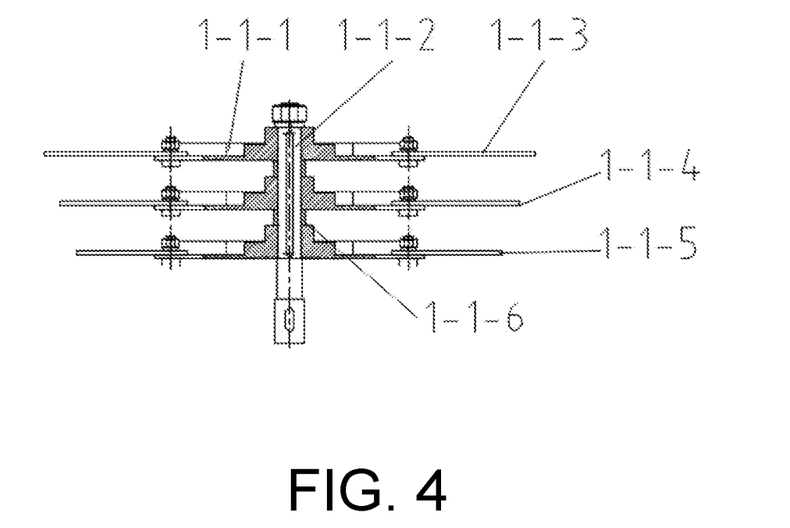
FIG. 4 is a structural diagram of a multi-layer disc cutting assembly according to an embodiment of the present disclosure.

Each of the multi-layer disc cutting assemblies 1-1 includes blade mounting flanges 1-1-1, a blade shaft 1-1-2, and at least three layers of blades. A plurality of blade mounting flanges 1-1-1 are arranged at one end of the blade shaft 1-1-2 sequentially from top to bottom. A spacer sleeve 1-1-6 is mounted between every two blade mounting flanges 1-1-1. A plurality of layers of blades are mounted on the plurality of blade mounting flanges 1-1-1 sequentially from top to bottom. Diameters of the blades sequentially decrease from top to bottom.

As shown in FIG. 4, each of the multi-layer disc cutting assemblies 1-1 includes three layers of blades, including a large blade 1-1-3, a middle-sized blade 1-1-4, and a small blade 1-1-5.

Figure 5:
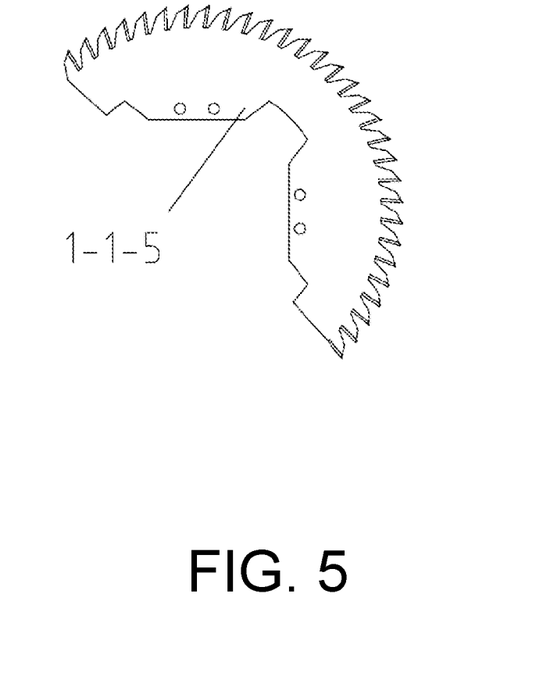
FIG. 5 is a structural diagram of a small blade according to an embodiment of the present disclosure.

As shown in FIG. 5, the large blade 1-1-3, the middle-sized blade 1-1-4, and the small blade 1-1-5 are all semi-circular saw blades. Preferably, the semi-circular saw blades are made of alloy steel, and are each provided with a mounting hole for connecting to the blade mounting flange 1-1-1.

The large blade 1-1-3, the middle-sized blade 1-1-4, and the small blade 1-1-5 are mounted on the blade mounting flanges 1-1-1 of the blade shaft 1-1-2 sequentially from top to bottom. A diameter of the large blade 1-1-3 is larger than a diameter of the middle-sized blade 1-1-4, and the diameter of the middle-sized blade 1-1-4 is larger than a diameter of the small blade 1-1-5.

As shown in FIG. 2, the multi-layer adjustable disc cutter 1 includes a plurality of groups of multi-layer disc cutting assemblies 1-1, and the blades of every two groups of multi-layer disc cutting assemblies 1-1 spatially overlap to a certain extent.

Figure 6:
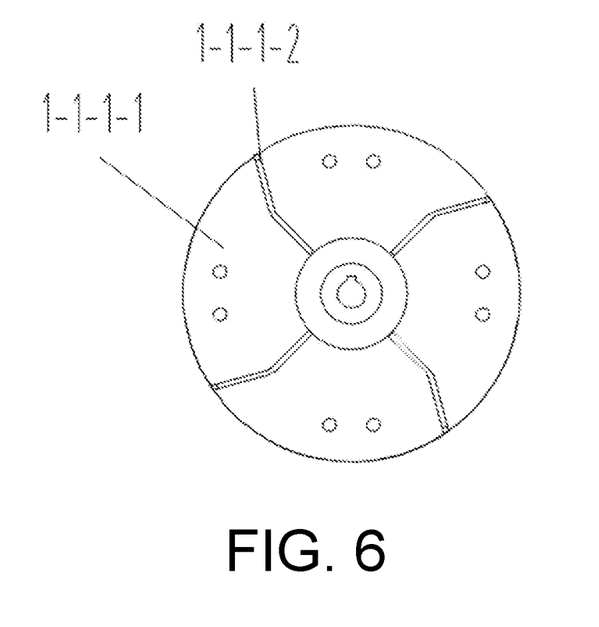
FIG. 6 is a structural diagram of a blade mounting flange according to an embodiment of the present disclosure.

As shown in FIG. 6, the blade mounting flange 1-1-1 includes a blade fixing disc 1-1-1-1 and blade fixing disc spokes 1-1-1-2, mounting holes are provided on a periphery of the blade fixing disc 1-1-1-1 for mounting the large blade 1-1-3, the middle-sized blade 1-1-4, or the small blade 1-1-5, and the blade fixing disc spokes 1-1-1-2 are welded to the blade fixing disc 1-1-1-1.

Figure 7:
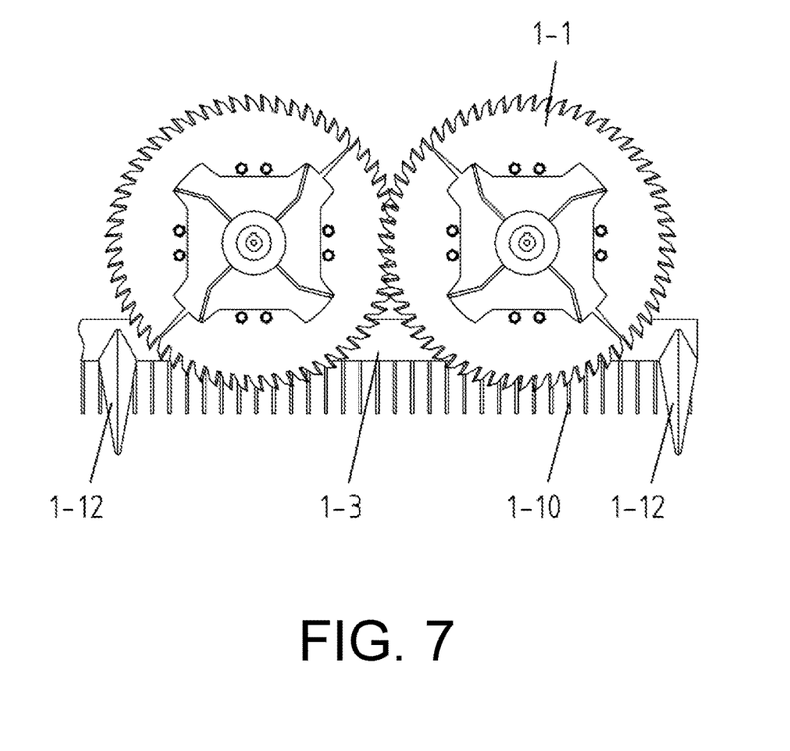
FIG. 7 is a diagram showing relative positions of a multi-layer adjustable disc cutter, a fixed blade, a crop separation plate, and a mounting plate according to an embodiment of the present disclosure.

As shown in FIG. 7, a plurality of fixed blades 1-10 and crop separation plates 1-12 are arranged at a front end of the mounting plate 1-3 along a length direction, and the multi-layer disc cutting assemblies 1-1 and the fixed blades 1-10 jointly provide a shearing effect. A group of multi-layer disc cutting assemblies 1-1 having opposite rotation directions are mounted between every two adjacent crop separation plates 1-12.

Figure 8:
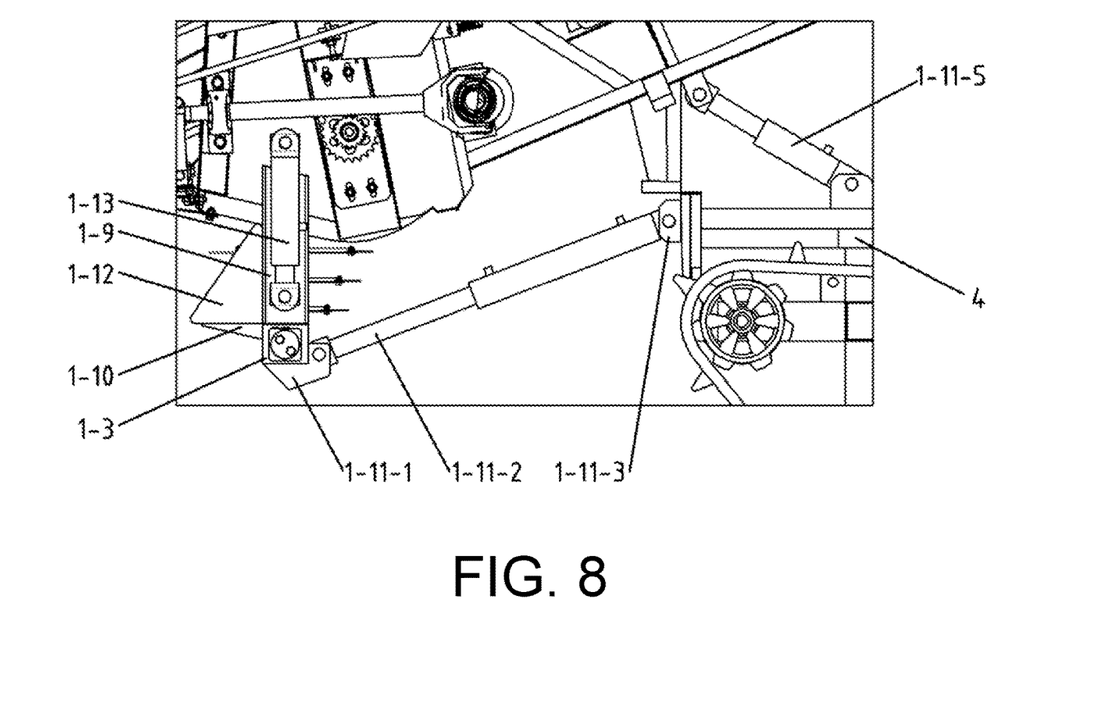
FIG. 8 is a structural diagram of an angle adjusting device of a multi-layer adjustable disc cutter according to an embodiment of the present disclosure.

As shown in FIG. 8, the ratooning rice harvesting header further includes a disc cutter angle adjusting device 1-11. One end of the disc cutter angle adjusting device 1-11 is connected to the mounting plate 1-3, and an other end of the disc cutter angle adjusting device 1-11 is configured to connect to a chassis 4 of a harvester. According to this embodiment, preferably, the disc cutter angle adjusting device 1-11 includes a first hydraulic cylinder connecting base 1-11-1, a disc cutter angle adjusting hydraulic cylinder 1-11-2, and a second hydraulic cylinder connecting base 1-11-3. The first hydraulic cylinder connecting base 1-11-1 is welded to a lower portion of the mounting plate 1-3, and is hingedly connected to one end of the disc cutter angle adjusting hydraulic cylinder 1-11-2 through a pin shaft, and an other end of the disc cutter angle adjusting hydraulic cylinder 1-11-2 is hingedly connected to the second hydraulic cylinder connecting base 1-11-3 through a pin shaft. The second hydraulic cylinder connecting base 1-11-3 is connected to the chassis 4 of the harvester. The disc cutter angle adjusting hydraulic cylinder 1-11-2 is a double-acting hydraulic cylinder.

Figure 10:
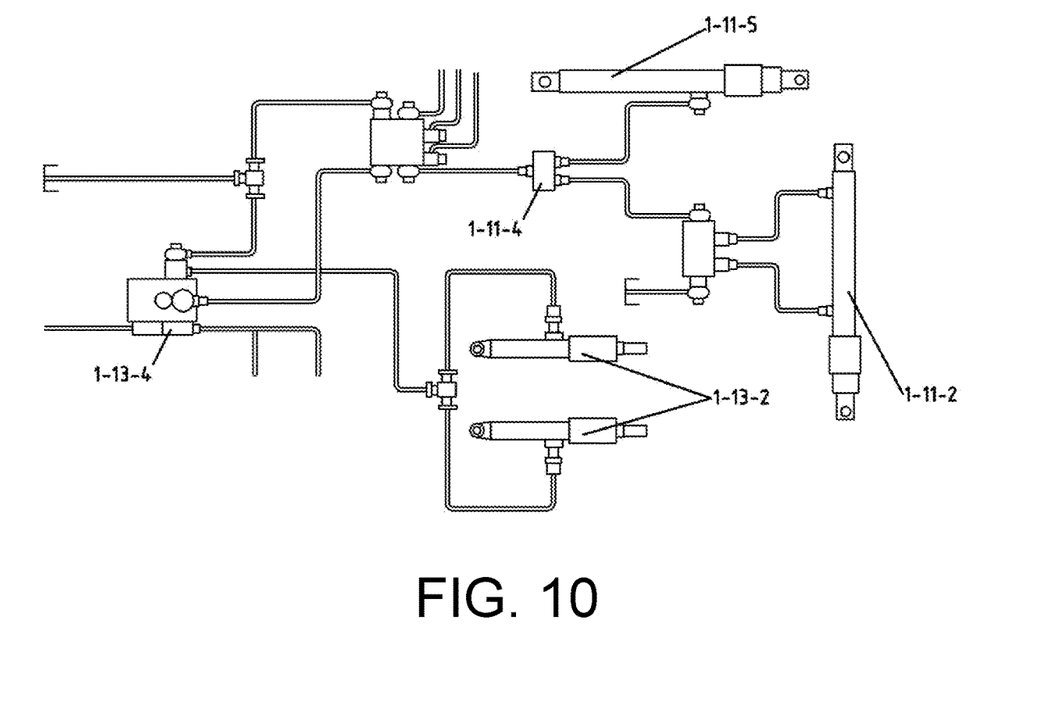
FIG. 10 is a structural diagram showing the schematic of a hydraulic system according to an embodiment of the present disclosure.

As shown in FIG. 10, the disc cutter angle adjusting hydraulic cylinder 1-11-2 is connected in parallel with the header height adjusting hydraulic cylinder 1-11-5 through a diverter valve 1-11-4. The diverter valve 1-11-4 distributes an hydraulic oil to the disc cutter angle adjusting hydraulic cylinder 1-11-2 and the header height adjusting hydraulic cylinder 1-11-5 according to a volume ratio of x, to ensure that the multi-layer adjustable disc cutter 1 keeps level all the time when the harvester driver adjusts the height of the header 2.

Figure 9:
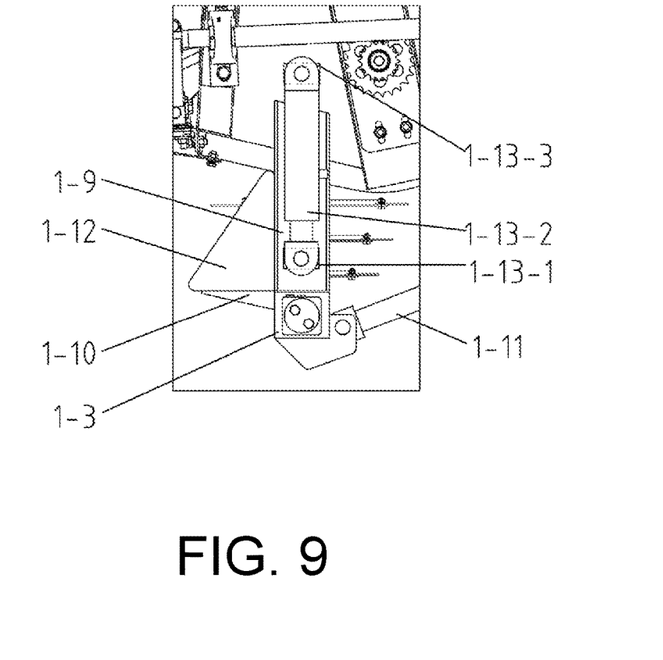
FIG. 9 is a structural diagram of a height adjusting device of a multi-layer adjustable disc cutter according to an embodiment of the present disclosure.

As shown in FIG. 9, the ratooning rice harvesting header further includes a disc cutter height adjusting device 1-13, configured to adjust a relative distance between the multi-layer adjustable disc cutter 1 and the header 2. One end of the disc cutter height adjusting device 1-13 is connected to the adjusting plate 1-9, and an other end of the disc cutter height adjusting device 1-13 is connected to the header 2. According to this embodiment, preferably, the disc cutter height adjusting device 1-13 includes a third hydraulic cylinder connecting base 1-13-1, a disc cutter height adjusting hydraulic cylinder 1-13-2, and a fourth hydraulic cylinder connecting base 1-13-3. The third hydraulic cylinder connecting base 1-13-1 is welded to a lower end of the adjusting plate 1-9, and is hingedly connected to one end of the disc cutter height adjusting hydraulic cylinder 1-13-2 through a pin shaft, and an other end of the disc cutter height adjusting hydraulic cylinder 1-13-2 is hingedly connected to the fourth hydraulic cylinder connecting base 1-13-3 through a pin shaft. The fourth hydraulic cylinder connecting base 1-13-3 is connected to a side surface of the header 2.

As shown in FIG. 10, the disc cutter height adjusting hydraulic cylinder 1-13-2 is a single-acting hydraulic cylinder and is connected to a two-way solenoid valve 1-13-4 of the harvester to control a working height of the multi-layer adjustable disc cutter 1.

Different series of spacer sleeves 1-1-6 having different lengths may be provided, to ensure that stalks cut by the multi-layer disc cutting assemblies 1-1 are uniform during harvesting of crops having different heights.

A rotation speed of the hydraulic transmission assembly 1-8 may be steplessly adjusted according to traveling speeds of different harvesters, so as to make the stubbles tidier.

According to this embodiment, preferably, the ear cutter 3 is a reciprocating cutter, which is a universal component in a grain combine harvester.

During operation, the ear cutter 3 mounted on the header 2 cuts rice stalks at an ear cutting height H1, and ears with only a small quantity of stalks fall into the header 2. With the advance of the harvester, the multi-layer adjustable disc cutter 1 cuts the remaining stalks for many times to a stubble height H2, and the stalks between H1 and H2 enter between adjacent multi-layer disc cutting assemblies 1-1 under the guidance of the crop separation plates 1-12, thereby effectively avoiding the phenomenon that some stalks are not cut. In addition, under the supporting action of the fixed blades 1-10, the stalks between H1 and H2 are sequentially cut three times by the large blade 1-1-3, the middle-sized blade 1-1-4, and the small blade 1-1-5 of the multi-layer adjustable disc cutter 1. The rice stalks that are cut off fall on the blade mounting flanges 1-1-1 and are quickly thrown off by the blade fixing disc spokes 1-1-1-2 along with the rotation of the blade fixing disc 1-1-1-1. At the same time, under the action of the disc cutter angle adjusting hydraulic cylinder 1-11-2, the multi-layer adjustable disc cutter 1 keeps a horizontal state all the time, so as to achieve an optimal stalk pulverizing effect.

As shown in FIG. 1, in the ratooning rice harvesting header, the multi-layer adjustable disc cutter 1 is located below the rear portion of the ear cutter 3 in a vertical direction, can cut the stalks between H1 and H2 many times, to prevent excessively long stalks from falling into the field, thereby facilitating the utilization of stalks into the field and the growth of rice in the next season. With the use of the saw blade structure having a continuous cutting function, the multi-layer adjustable disc cutter 1 provides a significantly improved effect in pulverizing on long stalks and has reduced power consumption for cutting and reduced structural weight, compared with a conventional pulverizing device using rectangular blades. As shown in FIG. 1, the ear cutter 3 of the ratooning rice harvesting header harvests only ears with short stalks, i.e., crop parts with low straw-grain ratio, so that the power consumption of threshing and cleaning can be greatly reduced. In addition, because most stalks do not enter the harvester, but instead, are cut by the multi-layer adjustable disc cutter 1, the harvester does not need to be equipped with a straw pulverizing device, thereby realizing the lightweight design and miniaturization of the entire harvester.

Embodiment 2

A harvester is provided, including the ratooning rice harvesting header described in Embodiment 1. Therefore, the harvester has the beneficial effects of Embodiment 1, and the details will not be repeated herein.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A harvester including a ratooning rice harvesting header, wherein the ratooning rice harvesting header comprises a multi-layer adjustable disc cutter, a header, and an ear cutter, the multi-layer adjustable disc cutter is mounted below the header and located below a rear portion of the ear cutter, and the ear cutter is mounted at a front end of the header; the multi-layer adjustable disc cutter comprises at least one group of multi-layer disc cutting assemblies, each group of the multi-layer disc cutting assemblies comprises two of the multi-layer disc cutting assemblies, each of the multi-layer disc cutting assemblies comprises three layers of vertically arranged blades, and blade rotation directions of the two of the multi-layer disc cutting assemblies are opposite to each other;

the multi-layer adjustable disc cutter comprises the multi-layer disc cutting assemblies, a mounting plate, a transmission mechanism, an adjusting plate, and fixed blades; the multi-layer disc cutting assemblies are mounted on the mounting plate, and a plurality of the fixed blades are arranged in a length direction of the mounting plate;

two ends of the mounting plate are connected to the adjusting plate, and an upper end of the adjusting plate is hingedly connected to the header;

the upper end of each of the adjusting plates is provided with a mounting groove arranged longitudinally, and the mounting groove is configured to hingedly connect to the header;

the multi-layer disc cutting assemblies are connected to the transmission mechanism;

each of the multi-layer disc cutting assemblies comprises blade mounting flanges, a blade shaft, and the three layers of blades; and at least three of the blade mounting flanges are arranged at one end of the blade shaft sequentially from top to bottom, a spacer sleeve is mounted between every two of the blade mounting flanges, the blades are mounted on the blade mounting flanges sequentially from top to bottom, and diameters of the blades sequentially decrease from top to bottom;

each of the multi-layer disc cutting assemblies comprises the three layers of blades, comprising a large blade, a middle-sized blade, and a small blade;

the large blade, the middle-sized blade, and the small blade are all semi-circular saw blades; the large blade, the middle-sized blade, and the small blade are mounted on the blade mounting flanges of the blade shaft sequentially from top to bottom;

and a diameter of the large blade is larger than a diameter of the middle-sized blade, and the diameter of the middle-sized blade is larger than a diameter of the small blade;

the blades of each group of the multi-layer disc cutting assemblies of the multi-layer adjustable disc cutter partially overlap the blades of an adjacent group of the multi-layer disc cutting assemblies in a space; and the multi-layer adjustable disc cutter further comprises: a disc cutter height adjusting device, configured to adjust a relative distance between the multi-layer adjustable disc cutter and the header, wherein one end of the disc cutter height adjusting device is connected to the adjusting plate, and an other end of the disc cutter height adjusting device is connected to the header.

2. The harvester according to claim 1, wherein each of the blade mounting flanges comprises a blade fixing disc and a blade fixing disc spoke;

and the blade fixing disc spoke is mounted on the blade fixing disc.

3. The harvester according to claim 1, further comprising: a disc cutter angle adjusting device, wherein one end of the disc cutter angle adjusting device is connected to the mounting plate, and an other end of the disc cutter angle adjusting device is configured to connect to a chassis of a harvester.

4. The harvester according to claim 1, wherein the multi-layer adjustable disc cutter further comprises a plurality of crop separation plates; and the crop separation plates are uniformly distributed in the length direction of the mounting plate, and a group of the multi-layer disc cutting assemblies having opposite rotation directions are mounted between every two adjacent ones of the crop separation plates.

* * * * *